No. 797,161. PATENTED AUG. 15, 1905.
H. S. WEST.
BAIT HOLDER.
APPLICATION FILED APR. 22, 1905.
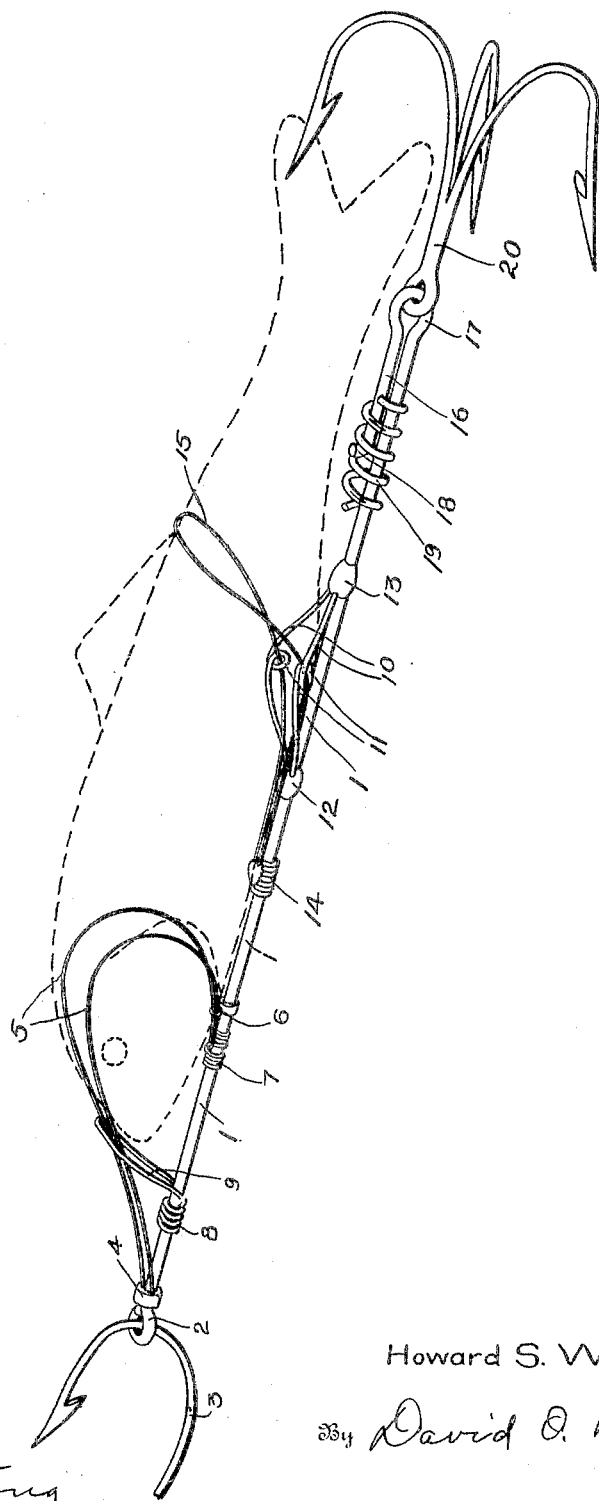
Witnesses:
L. C. Sharp
J. L. Armstrong
Inventor.
Howard S. West.
By David O. Barnell
Attorney.

UNITED STATES PATENT OFFICE.

HOWARD S. WEST, OF COUNCIL BLUFFS, IOWA.

BAIT-HOLDER.

No. 797,161.        Specification of Letters Patent.        Patented Aug. 15, 1905.

Application filed April 22, 1905. Serial No. 257,009.

*To all whom it may concern:*

Be it known that I, HOWARD S. WEST, a citizen of the United States, residing at Council Bluffs, in the county of Pottawattamie and State of Iowa, have invented certain new and useful Improvements in Bait-Holders, of which the following is a specification.

My invention relates to fishing-tackle, more particularly to bait-holding devices for use in bait casting and trolling.

It is the object of my invention to provide a light, strong, efficient, and convenient bait-holder in which minnows may be securely held without injury thereto, which may be adjusted to fit varying sizes of minnows from which the minnow may not be displaced accidentally or in taking a fish, and in connection with which various forms of hooks and lures may be used interchangeably.

My invention consists, first, in the special minnow-holding devices comprising a suitable connecting-shank, loops of adjustable size adapted to pass under the gill-covers of the minnow, a slidable friction take-up for retaining the gill-loops in engagement, a seat or saddle adapted to fit partly around the belly of the minnow, and a body-loop of adjustable size adapted to pass over the body of the minnow and hold the same onto the seat and in alinement with the connecting-shank, and, second, in the helical coil-fastening device for closing the attachment-loop at the rear end of the connecting-shank and preventing the accidental removal from said loop of hooks or lures which may be placed thereon.

In the accompanying drawing is shown a perspective view of a construction embodying my invention, the position of a minnow therein being indicated by dotted lines, a plain treble hook being shown attached to the holder and the entire device being shown as arranged in tandem with a leader-hook.

In the construction shown the main stem or shank 1 has an eye 2 at the front end thereof by which the same may be attached to a line or to a hook 3, as shown. At the point 4 adjacent to the eye 2 are fastened by soldering, brazing, or in other suitable manner the ends of the gill-loops 5, said loops being formed, preferably, of fine steel piano-wire. From 4 the wires forming the loops extend, first, rearwardly along the shank, then curve outwardly away from the shank and from each other, and, finally, curve inwardly and downwardly toward the shank and pass through the small eye 6, secured on the shank by suitable means.

From the eye 6 the wires extend forward and are connected to the friction-slide 7, which is formed by a small spring-wire wrapped several times around the shank, whereby the same is gripped sufficiently to prevent accidental movement of the slide. By pushing the said slide backward or forward along the shank the gill-loops may be made larger or smaller, as desired.

Between the slide 7 and the attaching-point 4 on the shank is placed the friction take-up, comprising the wire coil 8, placed around the shank, and the loop 9, extending upwardly and rearwardly therefrom and passing over the gill-loops, as shown. The loop 9 is formed by a continuation of the wire forming the coil 8, and the arrangement is such that any pressure upon the loop will cause the coil to bind upon the shank and prevent movement thereof along the same, although the coil may be moved along the shank in either direction by direct pressure on the ends of the coil.

A suitable distance to the rear of the gill-loops is placed the seat or saddle, comprising the wire bows 10, having the loops 11 at the central part thereof. The ends of said wires are secured to the shank at the points 12 and 13, as shown, and the wire bows are placed at such an angle to each other as to form a V-shaped seat or saddle adapted to fit around the belly of a minnow.

On the shank in front of the saddle is placed the friction-slide 14, the same being formed of wire coiled around the shank, and to said slide are fastened the ends of the wire forming the body-loop 15. From said slide the wires extend rearwardly and pass through the loops 11 at the sides of the saddle and are so directed by said loops as to curve upwardly and rearwardly to form the loop, as shown. The wire used in the said loop is preferably steel piano-wire, the same as that used for the gill-loops. The size of the loop may be adjusted by moving the friction-slide 14 backward or forward along the shank, and when the loop is thus adjusted the slight binding of the wires on the loops 11 assists the slide in retaining the adjustment.

In placing a minnow in the holder the back loop is opened by pushing the slide 14 backward along the shank, the friction-coil 8 of the take-up loop 9 is moved forward on the shank, thus permitting the gill-loops to be spread apart, and the size of the gill-loops is adjusted as desired by means of the friction-slide 7. The tail of the minnow is then passed through the back loop, the head is placed between the gill-loops, and the body of the minnow is pulled backward to bring the gill-loops up under the gill-covers of the fish. The take-up is then pushed backward to a point just in front of the head and nose of the minnow, thereby drawing the gill-loops together over the head and the same, together with the loop 9, preventing removal of the head from the gill-loops. The body-loop is then drawn down snugly over the back of the minnow, thereby holding the body down onto the saddle and in alinement with shank.

At the rear end of the shank a portion thereof 16 is bent forward upon the straight portion of the shank and the attachment loop or eye 17 formed thereby at the rear end of the shank. The extreme forward end 18 of the return-bend 16 is turned up, as shown. Passing around the shank and said return-bend is the small helical coil 19, the space between each turn of said coil being wide enough for the upturned end 18 of the return-bend to pass through the same. By turning the coil in the direction of the arrow marked thereon the same may be screwed off the return-bend past the upturned end 18 thereon, thus leaving the same free to be opened for the placing in the attachment-eye 17 or removal therefrom of suitable lures or hooks, such as the treble hook 20 shown. When the helical coil is screwed back over the return-bend, as shown, a hook may not be removed from the attachment-eye, and it will be apparent that the screwing motion necessary to move the coil along the shank effectually prevents accidental displacement thereof from the return-bend.

It will be noted that none of the devices attached to the shank for holding the minnow are of such nature as to catch on any object past which they may be moved, so that by the use of suitable guards on the hooks the device may be used for casting or trolling among weeds, snags, or other obstructions.

Now, having described my invention, what I claim, and desire to secure by Letters Patent, is—

1. In a bait-holder the combination with a stem or shank having means for the attachment thereof to a line, of wire loops attached to said shank, the form of said loops adapting the same to pass beneath the gill-covers of a fish, and a take-up for drawing said loops toward each other to retain the same in engagement with the head and gills of a fish placed between the same.

2. In a bait-holder the combination with a stem or shank and means for attaching the same to a line, of flexible loops attached to said shank and adapted to pass beneath the gill-covers of a fish the head of which is placed between the loops, and means for adjusting the size of said loops.

3. In a bait-holder the combination with a stem or shank and means for attaching the same to a line, of flexible loops attached to said shank and adapted to engage the gills of a fish the head of which is placed between the loops, a slidable take-up passing over said loops and adapted to retain the same in engagement with the gills of the fish, and an adjustable and flexible back loop adapted to pass around the body of the fish and hold the same in alinement with the shank.

4. In a bait-holder the combination of a stem or shank and means for connecting a line therewith, of flexible loops attached to said shank and adapted to engage the gills of a fish the head of which is placed between the loops, means for adjusting the size of the loops, a take-up for retaining the loops in engagement with the gills of the fish, a saddle carried by the shank and adapted to fit partly around the body of a fish, and an adjustable loop of flexible material adapted to pass around the body of a fish to hold the same upon the saddle.

5. In a device for fishing by trolling and casting, a stem or shank adapted to be connected with a line, adjustable loops of flexible material attached to said shank and adapted to engage the gills of a fish to hold the head thereof adjacent to the shank, a saddle carried by the shank, an adjustable loop of flexible material adapted to pass over the body of a fish and hold the same upon the saddle, and an eye formed on the end of the shank by a return-bend thereof, said eye being adapted to receive hooks or lures thereon and being closable by a helical coil passing screw-like around the shank and return-bend.

6. In a device for fishing by trolling and casting, a stem or shank, means for connecting the same with a line, and means for interchangeably attaching hooks or lures thereto, said attaching means comprising an eye formed upon the shank by a return-bend thereof, an upturned point upon said return-bend, and a helical coil passing around the shank and return-bend and movable longitudinally of the shank by turning the same screw-like past the upturned point on the return-bend.

In testimony whereof I have hereunto subscribed my name in the presence of two witnesses.

HOWARD S. WEST.

Witnesses:
 D. O. BARNELL,
 JOHN BADEKER.